Patented Oct. 31, 1922.

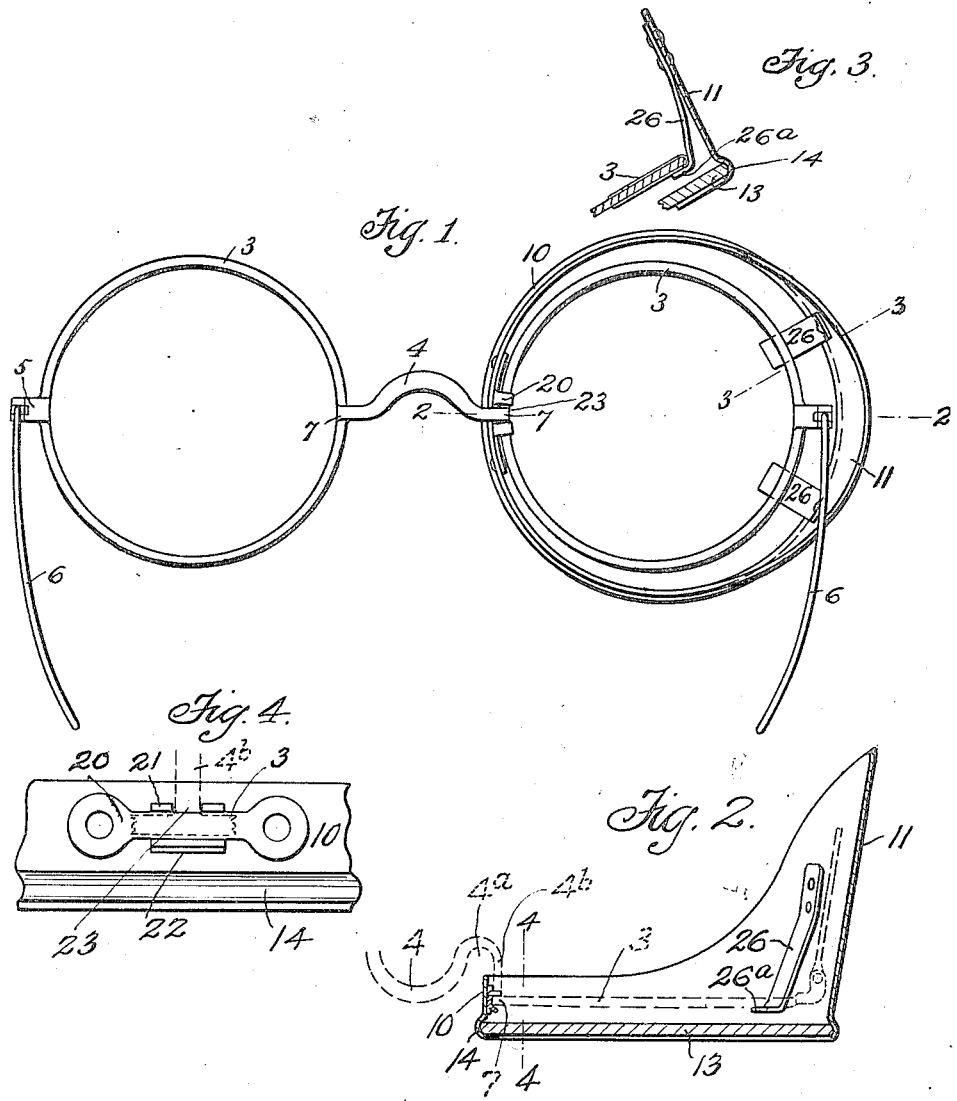

1,433,690

UNITED STATES PATENT OFFICE.

FREDERICK WILLSON AND HARRY F. SHINDEL, OF READING, PENNSYLVANIA, ASSIGNORS TO WILLSON GOGGLES, INC., OF READING, PENNSYLVANIA, A CORPORATION OF PENNSYLVANIA.

EYE-PROTECTOR ATTACHMENT FOR SPECTACLES.

Application filed April 7, 1921. Serial No. 459,492.

*To all whom it may concern:*

Be it known that we, FREDERICK WILLSON and HARRY F. SHINDEL, citizens of the United States, residing at Reading, in the county of Berks and State of Pennsylvania, have invented certain new and useful Improvements in Eye-Protector Attachments for Spectacles, of which the following is a specification.

The main object of this invention is to provide for satisfactorily utilizing correction-glass spectacles in connection with effective eye-protecting means readily detachable therefrom when not needed; and it consists in the improved eye-protector attachment hereinafter fully described in connection with the accompanying drawing and the novel features of which are clearly defined in the subjoined claims.

Fig. 1 is an interior view of ordinary correction-glass spectacles having our eye-protector attachment operatively applied to one only of the eye portions.

Figs. 2 and 3 are sectional views of the removed attachment taken on the lines 2—2 and 3—3 of Fig. 1, respectively.

Fig. 4 is a separate view of the rigid device for pivotally engaging the junction portion of the spectacle rim and nose-piece.

The correction glass spectacles indicated comprise the usual eye-wire lens frames 3, 3, connected by an ordinary nose-bridge member 4 and each provided with an end-piece member 5 having pivotally attached thereto the temple members 6.

Our attachment consists in a protection-glass eye-cup adapted to be easily applied to or removed from either of the lens rims 3 of the spectacles, and when so applied to serve as a complete protection both for the eye of the wearer and for the correction glass required by such wearer to secure proper vision.

The attachment consists of a separate eye-cup, comprising the usual rim-enclosing wall 10 having a side-shield extension 11 adapted to substantially enclose the eye socket of a wearer; the cup having a protection glass 13 secured in the circularly grooved outer edge 14 thereof, either permanently as most simply illustrated in the drawing or with provision for conveniently replacing such protection glass as is provided for in Shindel Patent No. 1,296,707 issued March 11, 1919.

Instead of connecting a pair of such eye-cups to form complete goggles as usual, each cup is adapted to be separately secured to or removed from one of the spectacle lens rims 3, and without involving any special provision on the spectacles for such attachment; this being effectively provided for by attaching devices 20, 26, 26, secured to the inner wall of the eye cup itself as indicated in the drawing.

The attaching device 20 is rigidly secured to the low inner portion of the rim enclosing wall of the cup, and is adapted to provide a pivotal engagement for the rim-and-nose piece junction 7 of the spectacles; such junction portion of the spectacles being insertable into the eye-cup, with the wall of the latter rising into the usual U-bend 4ª of the nose-bridge 4, and the portion of lens rim 3 which is adjacent the nose-bridge being engaged between spaced circular flanges 21, 22 of the device 20 while the vertical rim-connected portion 4ᵇ of the nose-bridge extends freely through a flange slot 23 of the device: This means of attachment providing for proper positioning of the eye-cup on the spectacle rim, and at the same time permitting of a pivotal swinging movement of the cup on the latter toward and away from the correction glass. After the eye-cup has been thus pivotally connected the securing of it in proper position is effected by the spaced attaching devices 26, 26 secured to the outer side-shield portion of the cup; each of these devices as shown having a flanged free end 26ª adapted to form a seat for the outer portion of the spectacle rim; and being resiliently bendable so as to permit of the latter being readily pressed into proper seating position, and to cause it to be retained in such position until it is deliberately unseated by a reverse pivotal movement of the cup for removing the same. This yielding retaining action of the devices 26 allows the eye-cup to be very easily attached or removed when desired, while at the same time any exterior force exerted upon the correction glass is yieldingly transmitted to the spectacle rim by contact of the latter with the flanged ends 26ª of the devices so as to very effectively safeguard the lenses.

What we claim is:

1. An eye-protector attachment for spectacles consisting of a protection-glass eye-cup having a rim-enclosing wall provided with rim-engaging devices adapted to removably secure the cup to the spectacles, said cup having a protection-glass holding rim extending forward of the spectacles.

2. An eye-protector attachment for spectacles consisting of a protecting eye-cup having a rim-enclosing wall, said wall being provided with an interior spectacle-attaching device adapted to pivotally engage the spectacle rim at the nose-piece and with resilient seating devices adapted to yieldably engage the outer portion of the spectacle rim; said cup having a protection glass holding rim extending forward of the spectacle engaging devices.

3. An eye-protector attachment for spectacles consisting of a protection-glass eye-cup having a rim-enclosing wall with side-shield extension, said wall being provided with a rgid device adapted to pivotally engage the spectacle rim at the nose-piece junction, and with spring-clip rim-seating devices on said side-shield extension; said cup having a protection-glass holding rim extending forward of the spectacle engaging devices.

In testimony whereof we affix our signatures.

FREDERICK WILLSON.
HARRY F. SHINDEL.